(12) United States Patent
Chen

(10) Patent No.: US 11,762,482 B2
(45) Date of Patent: Sep. 19, 2023

(54) MOUSE FOR CONTROLLING CURSOR MOVEMENT SPEED BASED ON PRESSURE AND CONTROL METHOD THEREOF

(71) Applicant: ZHUHAI HENGYU NEW TECHNOLOGY CO., LTD., Zhuhai (CN)

(72) Inventor: Junjian Chen, Zhuhai (CN)

(73) Assignee: ZHUHAI HENGYU NEW TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 17/424,145

(22) PCT Filed: Jan. 21, 2019

(86) PCT No.: PCT/CN2019/000011
§ 371 (c)(1),
(2) Date: Jul. 19, 2021

(87) PCT Pub. No.: WO2020/146961
PCT Pub. Date: Jul. 23, 2020

(65) Prior Publication Data
US 2022/0121295 A1    Apr. 21, 2022

(30) Foreign Application Priority Data
Jan. 17, 2019  (CN) .......................... 201910044535.1

(51) Int. Cl.
*G06F 3/0354*    (2013.01)
*G06F 3/038*     (2013.01)

(52) U.S. Cl.
CPC ........ *G06F 3/03543* (2013.01); *G06F 3/0383* (2013.01)

(58) Field of Classification Search
CPC .......................... G06F 3/03543; G06F 3/0383
See application file for complete search history.

(56) References Cited

U.S. PATENT DOCUMENTS

| 6,243,078 B1 * | 6/2001 | Rosenberg | ............... | G06F 3/011 |
| | | | | 345/161 |
| 10,592,008 B1 * | 3/2020 | Wang | ..................... | G06F 3/0346 |

(Continued)

FOREIGN PATENT DOCUMENTS

| CN | 1763698 A | 4/2006 |
| CN | 101644962 A | 2/2010 |

(Continued)

*Primary Examiner* — Chun-Nan Lin
(74) *Attorney, Agent, or Firm* — Bayramoglu Law Offices LLC

(57) ABSTRACT

A mouse for controlling a cursor movement speed based on a pressure is provided, which has a simple structure and a fast adjustment speed and can control the cursor movement speed based on the pressure of the mouse. The mouse includes a microprocessor, a pressure detection unit, a movement detection unit and a button detection unit. The pressure detection unit, the movement detection unit and the button detection unit are signal-connected to the microprocessor, respectively. When the movement detection unit detects a movement signal of the mouse, data sent by the mouse is adjusted based on the pressure detected by the pressure detection unit to change the cursor movement speed. The new mouse belongs to the technical field of computer peripherals.

1 Claim, 1 Drawing Sheet

(56) References Cited

U.S. PATENT DOCUMENTS

| | | | | |
|---|---|---|---|---|
| 2009/0207133 A1* | 8/2009 | Miura | ............... | G06F 3/0338 |
| | | | | 345/157 |
| 2009/0225030 A1* | 9/2009 | Vaananen | ............. | G06F 3/0485 |
| | | | | 345/163 |
| 2010/0149124 A1* | 6/2010 | Kim | ............... | G06F 3/0414 |
| | | | | 345/173 |
| 2010/0271295 A1* | 10/2010 | Braun | ............... | G06F 3/03543 |
| | | | | 340/407.2 |
| 2015/0042565 A1* | 2/2015 | Mizutani | ............ | G06F 3/0338 |
| | | | | 345/161 |
| 2015/0286295 A1* | 10/2015 | Pepe | ............... | G06F 3/0362 |
| | | | | 345/163 |
| 2018/0196574 A1* | 7/2018 | Case, Jr. | ............ | G06F 3/03545 |
| 2019/0361543 A1* | 11/2019 | Zhang | ............... | G06F 3/0488 |

FOREIGN PATENT DOCUMENTS

| | | |
|---|---|---|
| CN | 107092376 A | 8/2017 |
| CN | 108829278 A | 11/2018 |
| JP | 2008112234 A | 5/2008 |

\* cited by examiner

MOUSE FOR CONTROLLING CURSOR MOVEMENT SPEED BASED ON PRESSURE AND CONTROL METHOD THEREOF

CROSS REFERENCE TO THE RELATED APPLICATIONS

This application is the national phase entry of International Application No. PCT/CN2019/000011, filed on Jan. 21, 2019, which is based upon and claims priority to Chinese Patent Application No. 201910044535.1, filed on Jan. 17, 2019, the entire contents of which are incorporated herein by reference.

TECHNICAL FIELD

The present invention relates to a mouse, and more particularly, to a mouse for controlling a cursor movement speed based on a pressure and a control method thereof.

BACKGROUND

The mouse is an input device of the computer, and it is also an indicator of the vertical and horizontal coordinates of the computer display system. The cursor movement speed is related to both the mouse movement speed and the host settings. When the mouse movement speed is constant, if the cursor movement speed needs to be increased, it is necessary to adjust the host drive. Such an adjustment is very inconvenient, and other operations cannot be performed during the adjustment.

SUMMARY

In order to overcome the shortcomings of the prior art, the present invention provides a mouse for controlling a cursor movement speed based on a pressure and a control method thereof. The present invention has a simple structure and a fast adjustment speed and can control the cursor movement speed based on the pressure of the mouse.

The present invention adopts the following technical solutions. A mouse for controlling a cursor movement speed based on a pressure includes a microprocessor, a pressure detection unit, a movement detection unit and a button detection unit. The pressure detection unit, the movement detection unit and the button detection unit are signal-connected to the microprocessor, respectively. When the movement detection unit detects a movement signal of the mouse, data sent by the mouse is adjusted based on the pressure detected by the pressure detection unit to change the cursor movement speed.

Further, the mouse for controlling the cursor movement speed based on the pressure further includes a bottom plate and an upper cover. The pressure detection unit is a pressure sensor, and the pressure sensor is provided on the bottom plate. A pressure spring is provided between the upper cover and the pressure sensor.

A control method includes:

A1: detecting, by the movement detection unit, whether the mouse is moved; proceeding to step A2 if the movement detection unit detects that the mouse is moved by a distance L;

A2: detecting, by the pressure detection unit, whether the pressure applied to the mouse is changed; proceeding to step A3 when the pressure detection unit detects that the pressure is changed; and A3: obtaining, by the microprocessor, a movement factor P corresponding to the pressure detected by the pressure detection unit, and multiplying P and L to obtain a result P*L; then transmitting, by the microprocessor, a movement signal of P*L to a host.

The present invention has the following advantages. A mouse for controlling a cursor movement speed based on a pressure includes a microprocessor, a pressure detection unit, a movement detection unit and a button detection unit. The pressure detection unit, the movement detection unit and the button detection unit are signal-connected to the microprocessor, respectively. When the movement detection unit detects a movement signal of the mouse, data sent by the mouse is adjusted based on the pressure detected by the pressure detection unit to change the cursor movement speed. The present invention has a simple structure, can adjust the cursor movement speed based on the pressure of the mouse, and can realize fast adjustment of the cursor movement speed without adjustment on the host.

DETAILED DESCRIPTION OF THE EMBODIMENTS

Figure 1:
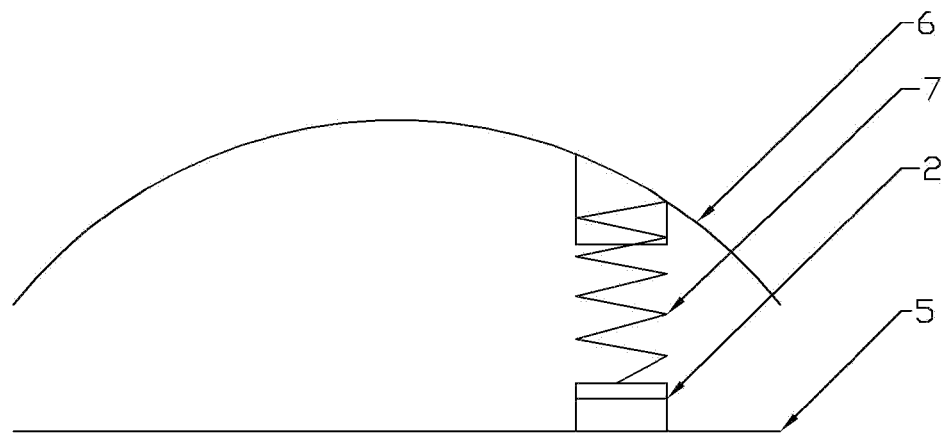
FIG. 1 is a schematic diagram of the structure of the present invention.
Figure 2:
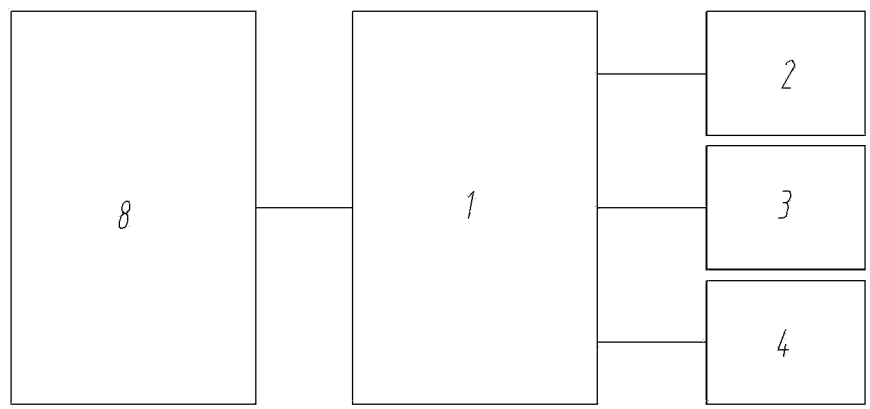
FIG. 2 is a schematic diagram of the electrical structure of the present invention.

As shown in FIGS. 1 and 2, according to an embodiment of the present invention, a mouse for controlling a cursor movement speed based on a pressure includes the microprocessor 1, the pressure detection unit 2, the movement detection unit 3 and the button detection unit 4. The pressure detection unit 2, the movement detection unit 3 and the button detection unit 4 are signal-connected to the microprocessor 1, respectively. In use, the microprocessor 1 communicates with the host 8. When the movement detection unit detects a movement signal of the mouse, data sent by the mouse is adjusted based on the pressure detected by the pressure detection unit to change the cursor movement speed.

In an embodiment, the mouse for controlling the cursor movement speed based on the pressure includes the bottom plate 5 and the upper cover 6. The pressure detection unit 2 is a pressure sensor, and the pressure sensor is provided on the bottom plate 5. The pressure spring 7 is provided between the upper cover 6 and the pressure sensor.

A control method includes the following steps:

A1: the movement detection unit 3 detects whether the mouse is moved; proceeding to step A2 if the movement detection unit 3 detects that the mouse is moved by a distance L.

A2: the pressure detection unit 2 detects whether the pressure applied to the mouse is change; proceeding to step A3 when the pressure detection unit 2 detects that the pressure is changed.

A3: the microprocessor 1 obtains a movement factor P corresponding to the pressure detected by the pressure detection unit 2, and multiplies P and L to obtain the result P*L; then the microprocessor 1 transmits a movement signal of P*L to the host.

In an embodiment, in case that the movement detection unit 3 detects that the mouse is moved, when the movement distance of the mouse is constant, data is sent by the mouse at a speed that increases as the pressure detected by the pressure sensor increases. For example, when the movement detection unit 3 detects that the movement distance of the mouse is 1, if the pressure detected by the pressure sensor at this time is 0, then data of the movement distance sent out is 1; if the pressure detected by the pressure sensor at this time is 500 g, then data of the movement distance sent out is 1.5; if the pressure detected by the pressure sensor at this time is 1000 g, then data of the movement distance sent out is 2, and so on. The present invention can adjust the cursor movement speed based on the pressure of the mouse, and can realize fast adjustment of the cursor movement speed without adjustment on the host.

The present invention is applied to the technical field of computer peripherals.

The embodiments of the present invention are described based on practical solutions, but the present invention is not limited thereto. It is obvious for those skilled in the art to make the modifications to the embodiments of the present invention and make the combination of these embodiments and other solutions according to this specification.

What is claimed is:

1. A control method applied to a mouse wherein the mouse comprises:

a microprocessor, a pressure detection unit, a movement detection unit, a button detection unit, a bottom plate, and an upper cover, wherein the pressure detection unit, the movement detection unit and the button detection unit are signal-connected to the microprocessor, respectively;

wherein the pressure detection unit is a pressure sensor, the pressure sensor is provided on the bottom plate, a pressure spring is provided between the upper cover and the pressure sensor, a bottom portion of the pressure spring is in contact with a top portion of the pressure sensor, a top portion of the pressure spring contacts an inner surface of the upper cover, and the pressure detection unit is configured to detect an amount of pressure applied to the mouse through the upper cover; and when the mouse moves, the movement detection unit detects a movement distance L of the mouse, and the movement distance L of the mouse is adjusted based on the amount of pressure applied to the mouse detected by the pressure detection unit to change the cursor movement speed in accordance with the amount of pressure applied to the mouse detected by the pressure detection unit, wherein the control method comprising the following steps of:

A1: detecting, by the movement detection unit, whether the mouse is moved; proceeding to step A2 when the movement detection unit detects that the mouse is moved by the movement distance L;

A2: detecting, by the pressure detection unit, whether the amount of pressure applied to the mouse is changed; proceeding to step A3 when the pressure detection unit detects that the amount of pressure is changed; and A3: obtaining, by the microprocessor, a movement factor P proportioned to the amount of pressure detected by the pressure detection unit, and multiplying P and L to obtain a modified movement distance of P*L; then transmitting, by the microprocessor, the modified movement distance of P*L to a host.

* * * * *